April 24, 1956 C. I. LOVELACE 2,742,731
CRABBING LURE DEVICE
Filed May 26, 1953

INVENTOR.
CHARLES I. LOVELACE
BY
McMorrow, Berman & Davidson
ATTORNEYS

United States Patent Office 2,742,731
Patented Apr. 24, 1956

2,742,731

CRABBING LURE DEVICE

Charles I. Lovelace, Phenix City, Ala.

Application May 26, 1953, Serial No. 357,595

2 Claims. (Cl. 43—44.99)

This invention relates to fish lures, and more particularly to an improved crabbing lure.

The main object of the invention is to provide a novel and improved crabbing lure which is simple in construction, which provides economical utilization of bait, and which provides a considerable saving in time, labor and expense in commercial crabbing.

A further object of the invention is to provide an improved crabbing lure device which involves inexpensive components, which is durable in structure, and greatly simplifies the operation of rebaiting the crabbing lines in commercial crabbing.

Further objects and advantages of the invention will become apparent from the following description and claims, and from the accompanying drawings, wherein:

Figure 2:
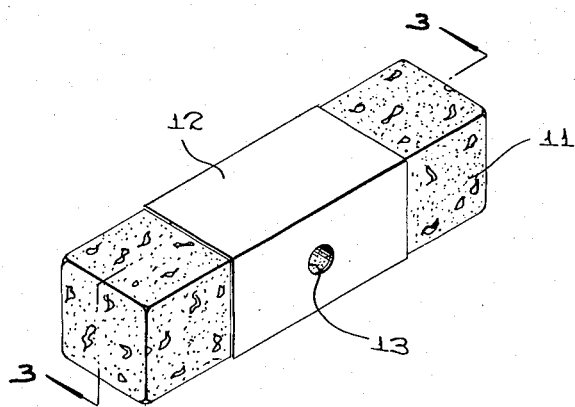
Figure 2 is an enlarged perspective view of one of the liquid bait-carrying block members employed in the arrangement of Figure 1.
Figure 3:
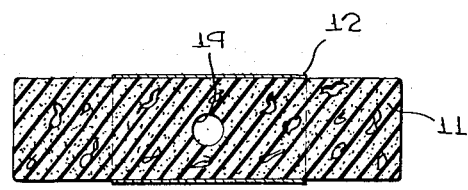
Figure 3 is a vertical cross sectional view taken on the line 3—3 of Figure 2.

Referring to the drawings, and more particularly to Figures 2 and 3, the illustrated device comprises a body 11 of sponge rubber, foam rubber, or similar porous material, which is preferably rectangular in shape but which may be of any desired elongated shape. Designated at 12 is a band of relatively rigid covering material, such as thin sheet plastic material or the like, which surrounds the intermediate portion of the body 11 and which covers a substantial portion of said body, whereby diffusion of liquid from the porous body 11 is substantially retarded when the lure device is immersed in water, as will be presently described.

Figure 1:
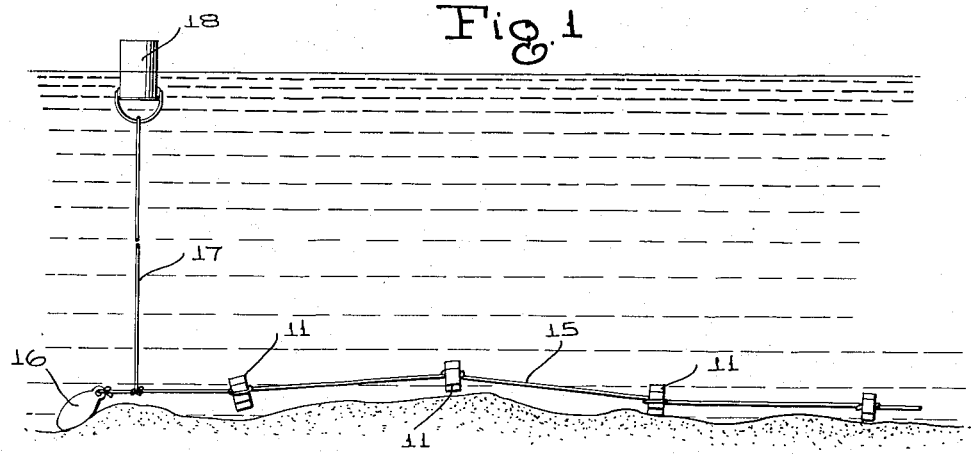
Figure 1 is a vertical view taken through a crabbing bed and illustrating the manner of employment of an improved crabbing lure arrangement in accordance with the present invention.

The band 12 is preferably formed at its opposite sides with apertures 13, and the body 11 is likewise formed with a transverse bore 14 registering with the apertures 13, whereby a fishing line or other securing means may be passed through the apertures 13 and the bore 14 to secure the body 11 to a line. For example, as shown in Figure 1, a plurality of blocks 11 may be connected in spaced relationship by a line 15, the line passing through the bore 14 and the apertures 13 and being knotted or otherwise suitably engaged to secure the body 11 against movement relative to the line. Fastened to one end of the line 15 is a weighted anchor member, such as a sinker 16, and connected to the line adjacent the anchor 16 is a line 17 to the end of which is attached a float member 18, whereby the location of the lure device can be determined.

To bait the device, the bodies 11 are first squeezed substantially dry and then dipped in a solution of bait liquid, such as a solution formed by boiling down shrimp heads and refuse from shrimp boats. The bodies 11 may be thus saturated with bait liquid without being removed from the line 15, and after having been thus saturated, the line 15 may be lowered into the water at the location desired and will then be arranged on the crabbing bed in the manner illustrated in Figure 1.

If so desired, the block members may be secured to the line 15 at their ends instead of at their intermediate portions by the use of any suitable connecting means, such as metallic clamps, or the like, secured on the line and clampingly engaging the block members. Alternatively said metallic clamps may engage the intermediate portions of the block members, at the bands 12, if so desired, whereby the block members are supported parallel to the line 15.

While a specific embodiment of an improved crabbing lure device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a fish lure, an elongated body of compressible porous material adapted to absorb bait liquid when released from a compressed condition in contact with the liquid, said body having opposed ends, and an intermediate portion, a band encircling and fixed to said intermediate portion of the body, said band being of relatively impermeable and rigid material, said band being spaced from the ends of said body, said body having a transverse bore, and said band having apertures at opposite sides thereof registered with said bore.

2. In a fish lure, an elongated body of compressible porous material adapted to absorb bait liquid when released from a compressed condition in contact with the liquid, said body having opposed ends, and an intermediate portion, a band encircling and fixed to said intermediate portion of the body, said band being of relatively impermeable and rigid material, said band being spaced from the ends of said body, said body having a transverse bore, and said band having apertures at opposite sides thereof registered with said bore, said body being rectangular in cross section.

References Cited in the file of this patent

UNITED STATES PATENTS

| Number | Name | Date |
|---|---|---|
| 1,010,481 | Crane et al. | Dec. 5, 1911 |
| 1,138,896 | Ryan | May 11, 1915 |
| 1,218,528 | Curcio | Mar. 6, 1917 |
| 1,255,053 | Satrum et al. | Jan. 29, 1918 |
| 2,054,407 | Campbell | Sept. 15, 1936 |
| 2,129,245 | Stenstrom | Sept. 6, 1938 |
| 2,555,088 | Irwin | May 29, 1951 |
| 2,686,381 | Peterson | Aug. 17, 1954 |